Jan. 2, 1951   E. FENNESSY   2,536,433
RADIO NAVIGATIONAL AID
Filed May 13, 1947   2 Sheets-Sheet 1

INVENTOR
EDWARD FENNESSY.
BY
ATTORNEY.

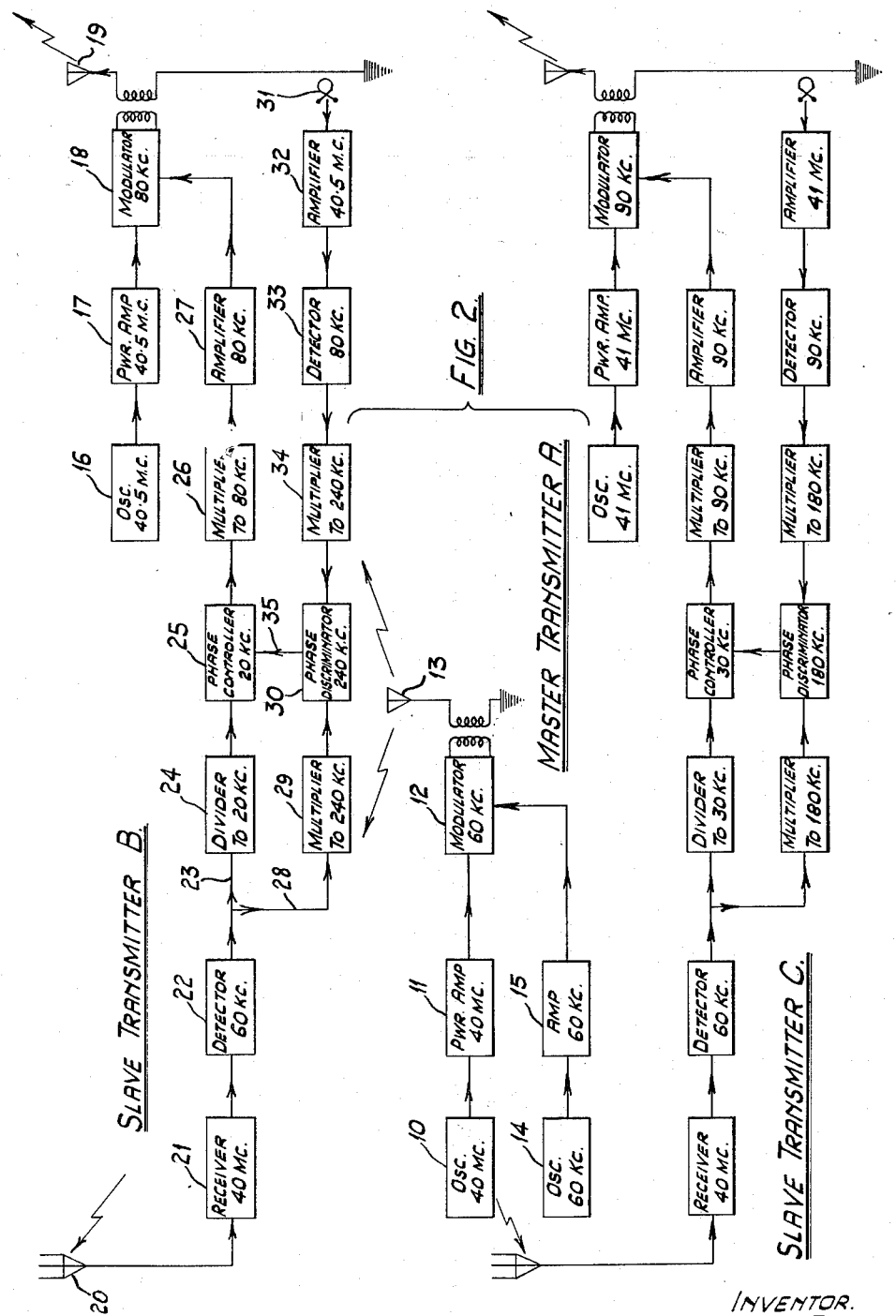

Patented Jan. 2, 1951

2,536,433

UNITED STATES PATENT OFFICE 2,536,433

RADIO NAVIGATIONAL AID

Edward Fennessy, Orpington, England, assignor to The Decca Record Company, Limited, London, England, a corporation of Great Britain Application May 13, 1947, Serial No. 747,660
In Great Britain May 17, 1946

6 Claims. (Cl. 343—105)

This invention relates to radio navigational aids and has particular reference to a radio frequency transmitting and receiving system for indicating continuously the geographical location of a mobile vehicle.

In a co-pending application of William J. O'Brien Serial Number 612,987 filed August 27, 1945 entitled "Navigation System" now abandoned and assigned to the assignee of this application, there is described a radio frequency navigational system for aiding the navigation of mobile vehicles. The system referred to employs a master transmitting apparatus and at least two slave transmitters operating simultaneously to continuously radiate at least three signals of different but harmonically related frequencies which are maintained in a fixed multiple phase relation to each other.

The mobile receiving apparatus comprises means for separately receiving the radiated signals, frequency converting apparatus for producing from the received signals at least two pair of equal frequency signals, and phase indicators for measuring and continuously indicating the phase relation between the reference signals of each pair.

The transmitting apparatus may, for example, operate on the sixth, eighth and ninth harmonics of a selected fundamental frequency. In the receiving apparatus a pair of twenty-fourth harmonic reference signals are derived from the received sixth and eighth harmonics, and a pair of eighteenth harmonic reference signals are similarly derived from the sixth and ninth harmonics. In the example chosen, the transmitting apparatus thus operates to establish two overlapping equi-phase displacement field patterns, one at the eighteenth harmonic frequency, and one at the twenty-fourth harmonic frequency. The receiving apparatus operates to continually indicate the location of the mobile vehicle in terms of the two equi-phase displacement field contours thus established.

With a system of the character described using frequencies of the order of magnitude of 100 kc., a position fix with an error not exceeding a few yards is readily obtained in that portion of the area served by the system which lies in the near vicinity of the transmitters. However, since the field patterns are hyperbolic, the accuracy reduces as the distance from the transmitters is increased, due in part to the divergence of the equi-phase lines, and in part due to the acuteness with which the lines of one pattern intersect those of the other. It follows that in the near vicinity of the transmitters the accuracy is sufficient for airport approaches, and for river and harbour navigation, while at distances of about 300 miles, the accuracy is not sufficiently high to meet the exacting requirements of such navigational problems.

It is therefore an object of this invention to provide an improved navigational system for use in conjunction with a system of the character referred to and which operates to provide high accuracy in relatively local areas in which the overall system accuracy is low.

It is another object of this invention to provide a navigational system of the character described in the preceding paragraph which employs at said local areas short range very high frequency transmitting apparatus operating to radiate signals modulated at unlike but harmonically related frequencies, and in which said modulation frequencies bear a fixed multiple phase relation to each other.

It is also an object of this invention to provide a navigational system of the character set forth in the preceding paragraph in which said modulation frequencies are identical to the radio frequency signals used to establish the overall navigational pattern.

It is a still further object of this invention to provide an improved navigational system of the character hereinbefore referred to which includes a receiving apparatus arranged to selectively receive directly the signals of said overall pattern, or alternatively to receive and demodulate said very high frequency modulated signals.

It is also an object of this invention to provide a receiving apparatus of the character set forth in the preceding paragraph in which the same phase measuring and indicating equipment is used with either set of signals.

Other objects and advantages of this invention will be apparent from a consideration of the following description read in connection with the accompanying drawings wherein:

Fig. 2 is a block diagram illustrating the master and slave transmitting equipment comprising the auxiliary system represented in Fig. 1.

Figure 1:
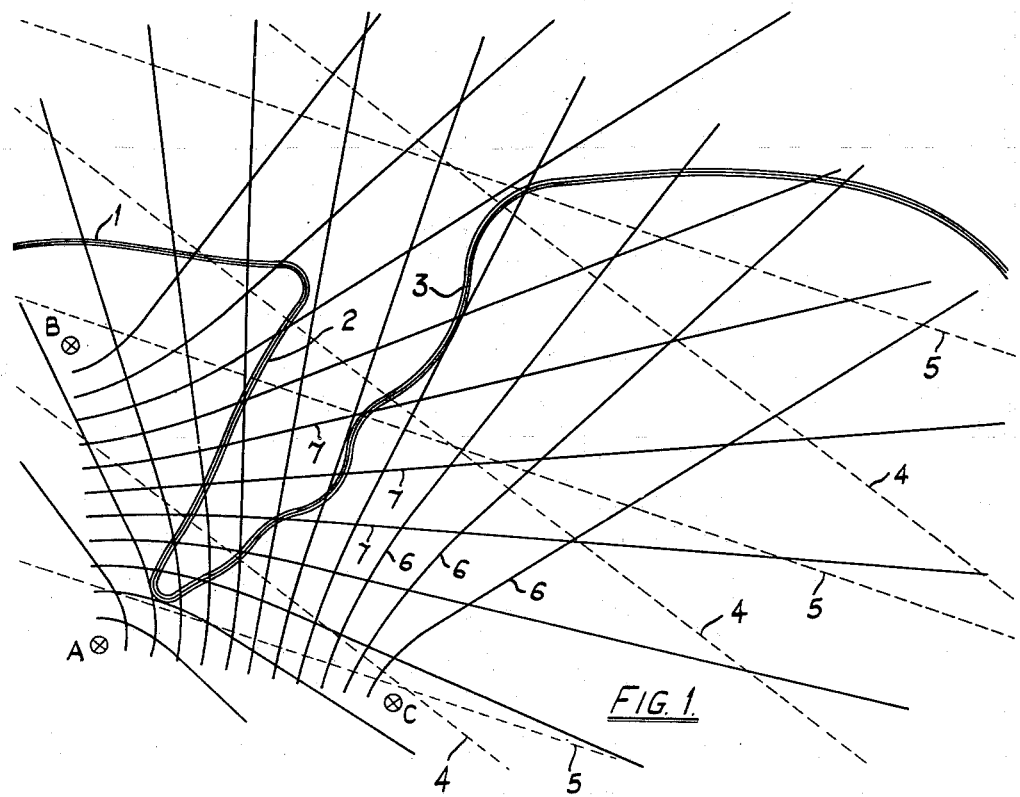
Fig. 1 is a diagram illustrating the manner in which the auxiliary system of this invention operates to increase the accuracy of position indication within a relatively local area.

Referring to the drawings I have illustrated in Fig. 1 a portion of a map or chart of an area by an overall navigational system such as that disclosed in the aforementioned co-pending application Serial Number 612,987. The local area represented in Fig. 1 is considered to be situated a considerable distance from the transmitting apparatus of the overall system and may comprise an area within which high accuracy of position indication is extremely desirable. The area may include a shore line such as represented at 1 and which is indented as shown at 2 and 3 to define a bay or estuary. The estuary may comprise a port or harbour within which it is desired to navigate surface ships with considerable accuracy. However, because of its distance from the transmitting apparatus of the overall system, the accuracy afforded by that system may be relatively low due to the relatively wide spacing between the equi-phase contours and due also to the actute angle which the contours of one co-ordinate makes with the contours of the other. Such a relatively inaccurate form of coverage is represented by the dotted lines in Fig. 1 in which the dotted lines 4 represent the equi-phase contours of one co-ordinate and in which the dotted lines 5 represent the equi-phase contours of the other co-ordinate.

According to this invention the accuracy of positional fix within the estuary is greatly increased by using a relatively short range very high frequency auxiliary navigational system which may comprise a master transmitter at location A and slave transmitters at locations B and C. These transmitters operate to establish two overlapping sets of equi-phase field contours such as are represented in Fig. 1 by the solid lines 6 and 7.

The overall navigational pattern 4, 5 may be assumed to be established by means of transmitters operating on sixth, eighth and ninth harmonics of a given fundamental frequency as, for example, frequencies of 60, 80 and 90 kc. According to this invention the auxiliary apparatus at locations A, B and C operates at a very high frequency of the order of magnitude of 40 megacycles or more and is amplitude modulated at the same frequencies as are used to establish the overall pattern 4, 5. According to the assumed example the signals radiated from locations A, B and C will therefore be modulated at frequencies of 60, 80 and 90 kc. respectively. The spacing between the locations A, B and C may be selected as desired with a view to disposing the field contours 6 and 7 in the most advantageous arrangement with respect to the local area to be served by the auxiliary system, namely, the estuary defined by the shore lines 2 and 3.

In Fig. 2 there is illustrated by means of a block diagram transmitting apparatus which may be employed for establishing the auxiliary navigational pattern. The master transmitter which is situated at location A may comprise a source of very high radio frequency energy such as an oscillator 10. This oscillator may be tuned to any desired very high frequency as, for example, a frequency of 40 megacycles. The oscillator 10 is coupled to a power amplifier 11 which feeds a modulator 12, the modulator being coupled in any suitable manner to a transmitting antenna 13 situated at location A. There is also employed an oscillator 14 or signal generator which is tuned to the sixth harmonic of the given fundamental frequency upon which the navigational pattern is based. In accordance with the assumed example the oscillator 14 is tuned to 60 kc. The oscillator 14 is coupled to an amplifier 15 the output of which is applied to the modulator 12 so that the signals radiated from the antenna 13 comprises 40 megacycle signals amplitude modulated at a frequency of 60 kcs.

The slave transmitting apparatus which is situated at location B comprises a means for radiating high frequency signals of a frequency different from those radiated from location A together with means for modulating those signals at the eighth harmonic of the selected fundamental frequency and together with means for maintaining a fixed multiple phase relation between the 80 kc. modulation and the 60 kc. modulation originating at location A. The slave transmitter B may accordingly comprise a source of very high frequency energy such as an oscillator 16 tuned, for example, to a frequency of 40.5 megacycles. The output of the oscillator 16 is coupled to the power amplifier 17 which in turn feeds a modulator 18. The modulator 18 is coupled in a suitable manner to a transmitting antenna 19 which is situated at location B.

In order to maintain the required fixed multiple phase relation between the 80 kc. modulation signal from location B and the 60 kc. modulation signal from location A, the 80 kc. signal is derived from the 60 kc. signal. To this end there is employed at location B a receiving antenna 20 which is coupled to a radio frequency receiver 21 tuned to 40 megacycles so as to receive the very high frequency signal radiated from antenna 13 at location A. The output of the receiver 21 is applied to a detector circuit 22 which serves to de-modulate the received signal and produce a 60 kc. output. This 60 kc. output is fed as indicated at 23 to a divider 24 operating to produce a 20 kc. output signal. The 20 kc. output signal is passed through a phase controller 25 to a frequency multiplier 26 which operates to produce from the 20 kc. input an 80 kc. output signal. The 80 kc. output signal is amplified by means of an amplifier 27 coupled to the modulator 18 so as to modulate at 80 kc. the 40.5 megacycle signal radiated from antenna 19.

A portion of the 60 kc. output of the detector 22 is applied as indicated at 28 to a frequency multiplier circuit 29 which operates to produce a 240 kc. output signal. This output signal is applied to one input circuit of a phase discriminator 30. The other input to the phase discriminator circuit is derived from a pick-up loop 31 positioned near the circuit of antenna 19 so as to be excited at the radiated frequency of 40.5 megacycles. The small signal thus induced in the loop 31 is applied to a 40.5 megacycle amplifier 32 the output of which is connected to a detector 33. The detector 33 operates to de-modulate the input signal and so produce an output signal having a frequency of 80 kcs. This 80 kc. signal is passed to a frequency multiplier 34 which operates to produce a 240 kc. output signal which is applied to the other input circuit of the phase discriminator 30.

The phase discriminator 30 may be of any suitable type but a preference is expressed for a phase discriminator circuit of the character disclosed in a co-pending application filed by William J. O'Brien Serial Number 612,991 filed August 8, 1945 and entitled Multiple Channel Radio Frequency Receiver, now Patent No. 2,500,200 issued March 14, 1950.

The phase discriminator circuit described in the above identified application operates to compare the phase of two input signals of like frequency (in this case the two 240 kc. signals from the multipliers 29 and 34) and produce a direct control potential the magnitude and polarity of which is a function of the phase relation between the two input signals. This direct control potential is applied as indicated at 35 to the phase controller 25.

Any suitable form of phase controller 25 may be employed but a preference is expressed for the phase regulating circuit disclosed in a copending application filed by William J. O'Brien Serial Number 612,985 filed August 27, 1945 and entitled Radio Frequency Transmission Apparatus, now abandoned. The phase controller which is described in the above identified application includes a tuned circuit having connected thereto a thermionic vacuum tube connected in a reactance circuit so that the tuned circuit may be slightly de-tuned by varying the grid bias of the thermionic tube. This grid bias shift is derived from the variations in the direct control potential produced by the phase discriminator 30.

The apparatus is so arranged that whenever the phase of the 80 kc. modulation signal radiated from antenna 19 shifts from a normal relationship with respect to the received 60 kc. modulation signal the resulting change in the direct control potential produced by the phase discriminator 30 will so control the operation of the phase controller 25 as to introduce into the 80 kc. signal a phase shift in a direction tending to restore the multiple phase relation between the 60 and 80 kc. signals to the desired normal. It will be seen that the equipment thus operates as a phase regulator to maintain a fixed and unchanging phase relation between the 60 and 80 kc. modulation envelopes.

The apparatus comprising the slave transmitter situated at location C is identical to that described at location B except that the carrier frequency employed is different from the master or first slave carrier frequency and may be, for example, 41 megacycles. Also the modulation frequency used is 90 kc. and the phase comparison for phase controlling purposes is made on the basis of a frequency of 180 kc.

It will be seen that the transmitting apparatus just described operates to radiate from locations A, B and C three unlike radio frequency signals of very high frequency and that these signals are modulated at frequencies corresponding to the sixth, eighth and ninth harmonics of a selected fundamental frequency. It will be appreciated that by reason of the very high frequency used as a carrier frequency the range of the auxiliary system is relatively short, the carrier frequencies being chosen with a view to limiting the ground wave to relatively short distances and with a view to eliminating sky wave reflections. It will thus be seen that within the area served by the overall navigation system short range systems of the type described for the purpose of creating over certain areas an equiphase displacement field pattern of materially higher accuracy than is established in that area by the overall navigation system. These separate systems may operate independently of each other and because of their very short range characteristic introduce no problems concerning interference or overlapping.

Figure 3:
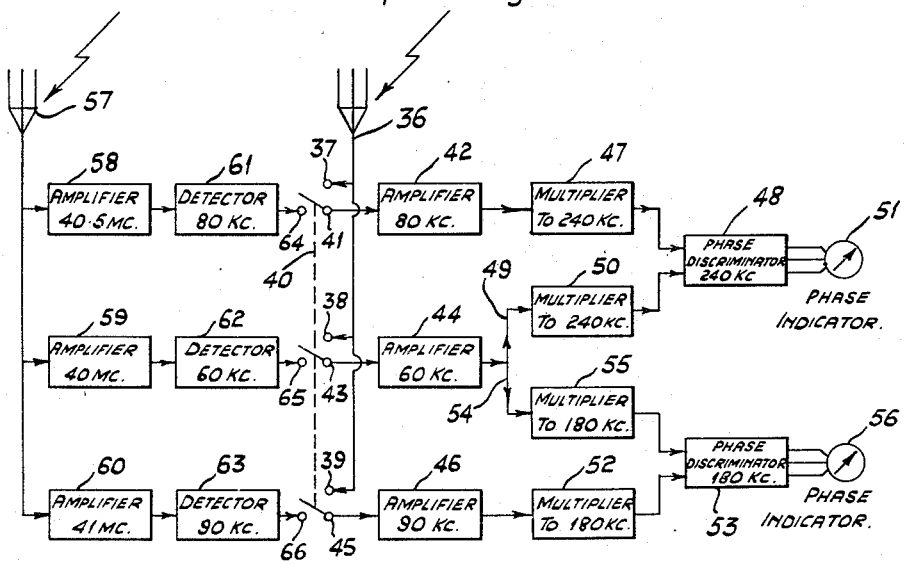
Fig. 3 is a block diagram of a receiving apparatus which may be used alternatively with the overall system or with the auxiliary system forming the subject matter of this invention.

In Fig. 3 there is illustrated a receiving apparatus which may be used alternatively with the overall navigational system and with the various auxiliary systems such as just described. For use with the overall navigational system there is employed a receiving apparatus such as that described in the afore-mentioned co-pending application Serial Number 612,991 which may include a receiving antenna 36 suitable for receiving the radio frequency signals comprising the overall navigational system. The antenna 36 is connected to corresponding contacts 37, 38 and 39 of a three pole double throw switch 40. One blade 41 of the switch is connected to an amplifier 42 tuned to one of the received frequencies as, for example, 80 kc.; a second blade 43 is connected to an amplifier 44 which may be tuned to 60 kc.; and a third switch blade 45 is connected to a third amplifier 46 which may be tuned to the remaining frequency of 90 kc. The output of the amplifier 42 is fed to a frequency multiplier 47 operating to produce a 240 kc. output signal which is fed to one input of a phase discriminator 48. The output of the 60 kc. amplifier 44 is coupled as indicated at 49 to a frequency multiplier 50 which produces a second 240 kc. output signal, the second 240 kc. signal being connected to the second input circuit of the phase discriminator 48. The phase relationship between the two 240 kc. signals measured and determined by the phase discriminator 48 is indicated on a suitable phase indicator 51 coupled to the discriminator 48. Similarly the 90 kc. output of the amplifier 46 is doubled to a frequency of 180 kc. in a frequency multiplier 52 which feeds one input circuit of another phase discriminator 53. The output of the 60 kc. amplifier 46 is connected as shown at 54 to a frequency multiplier 55 which produces a second 180 kc. signal which is fed to the second input circuit of the phase discriminator 53. The phase relation between the two 180 kc. signals is indicated by a phase indicator 56 coupled to the phase discriminator 53.

While any suitable form of phase indicator for the indicators 51 and 56 may be employed, a preference is expressed for a phase indicator of the character disclosed in co-pending application filed by William J. O'Brien Serial Number 612,984 filed August 27, 1945 and entitled "Registering Goniometer," now Patent No. 2,499,326 issued February 28, 1950.

The apparatus just described with the switch 40 thrown to position connecting amplifiers 42, 44 and 46 to the receiving antenna 36, is identical to the receiving apparatus shown in the aforementioned co-pending application Serial Number 612,991.

In addition to the apparatus just described the receiving apparatus of this invention includes a second receiving antenna 57 of a type suitable for the receiving of very high frequency signals such as are radiated from the aforementioned locations A, B and C. This antenna is coupled to three very high frequency amplifiers 58, 59 and 60 tuned respectively to the three carrier frequencies radiated from locations A, B and C; that is, to frequencies of 40.5, 40.0 and 41.0 megacycles. The output of each of the amplifiers 58, 59 and 60 is connected to corresponding detector circuits 61, 62 and 63 which operate to de-modulate their respective input signals and provide output signals of 80, 60 and 90 kc. The output of the detector circuits 61, 62 and 63 are connected to contacts 64, 65 and 66 of the three pole double throw switch 40. With this arrangement the switch 40 may be thrown to a position alternative to that hereinbefore described so as to connect the detector circuits 61, 62 and 63 to the input circuits of the amplifiers 42, 44 and 46.

It will be appreciated that when the switch is thrown to the alternate position the 80, 60 and 90 kc. signals from the detector circuits 61, 62 and 63 will be handled by the remainder of the receiving apparatus in exactly the same way as when the 80, 60 and 90 kc. radio frequency signals are derived from the receiving antenna 36.

In accordance with the intended mode of operation, a receiver of the character illustrated in Fig. 3 carried by a surface ship or aircraft will normally be operated with the amplifiers 42, 44 and 46 connected to the receiving antenna 36 so that the navigation of the vehicle will be guided by the overall navigational system. When, however, the ship or aircraft approaches a harbour or airport fitted with the auxiliary system described in this specification, the switch 40 is thrown to the alternative position so as to provide positional data with reference to the alternative navigational pattern established by the auxiliary system. It will be seen that the amount of additional receiving equipment which must be carried by a surface ship or aircraft in order to take advantage of the facilities offered by such an auxiliary system is very small indeed, it being appreciated that the very high frequency amplifier and detector circuits may be made of small light weight components and so assembled as an inexpensive and light weight unit.

In the foregoing there has been described an improved navigational system using auxiliary sets of transmitting apparatus which may provide short range navigational signals providing greatly improved accuracy in certain local areas where such improved accuracy is highly desirable. It will be observed also, that the system described includes auxiliary receiving apparatus making it possible for a given ship or aircraft to use alternatively, and as desired, the navigational signals comprising an overall navigational pattern or those comprising a higher accuracy local auxiliary pattern. Attention is directed particularly to the very small amount of additional equipment required to adapt the mobile receiving apparatus for operation at will on either system.

While there has been shown and described the preferred embodiment of this invention the same is not to be limited to the details illustrated and described herein except as defined in the appended claims.

I claim:

1. In a radio frequency navigational aid, the combination of: transmitting means at spaced points for simultaneously radiating from said points very high radio frequency energy at different frequencies; means at each of said transmitting means for modulating each of said very high radio frequency radiations at a different modulation frequency, said different modulation frequencies being harmonically related; and means for maintaining a fixed multiple phase relation among said modulation frequencies.

2. In a radio frequency navigational aid, the combination of: transmitting means at spaced points for simultaneously radiating from said points very high radio frequency energy at different frequencies; means at each of said transmitting means for amplitude modulating each of said very high radio frequency radiations at a different modulation frequency, said different modulation frequencies being harmonically related; and means for maintaining a fixed multiple phase relation among said modulation frequencies.

3. In a radio frequency navigational aid, the combination of: transmitting means at spaced points for simultaneously radiating from said points radio energy of different frequencies each in excess of thirty megacycles per second; means at each of said transmitting means for modulating each of said very high radio frequency radiations at a different modulation frequency, said different modulation frequencies being harmonically related; and means for maintaining a fixed multiple phase relation among said modulation frequencies.

4. In a radio frequency navigational aid, the combination of: transmitting means at spaced points for simultaneously radiating from said points very high radio frequency energy at different frequencies; means at each of said transmitting means for modulating said very high radio frequency radiations at a different modulation frequency, said different modulation frequencies being harmonically related; means for maintaining a fixed multiple phase relation among said modulation frequencies; receiving means for simultaneously receiving said radiations; means at said receiving means for demodulating the received radiations to produce output signals having said different modulation frequencies; and means for measuring and continuously indicating the multiple phase relation among said output signals.

5. In a radio frequency navigational aid, the combination of: a master transmitter for radiating a very high radio frequency signal modulated at a master modulation frequency; a pair of slave transmitters spaced from said master transmitter and spaced from each other for radiating very high radio frequency signals of different frequencies each different than the signal radiated by said master transmitter and each modulated at different slave modulation frequencies each bearing a harmonic relation to said master modulation frequency; and means at each of said slave transmitters for maintaining a fixed multiple phase relation between said slave modulation frequencies and said master modulation frequency.

6. In a radio frequency navigational aid, the combination of: means at spaced points for radiating three radio frequency signals of different but harmonically related navigation frequencies bearing a fixed multiple phase relation to each other for defining an over-all navigational pattern of intersecting equi-phase displacement field contours; means for radiating from three other spaced points very high frequency radio energy of unlike frequency modulated at said navigation frequencies and with said modulations bearing a fixed multiple phase relation to each other for defining a local navigational pattern of intersecting equi-phase displacement field contours; and a mobile receiving device comprising receiving means for separately receiving said radio frequency signals, receiving and detecting means for separately receiving and de-modulating said very high frequency radiations, apparatus for measuring and continuously indicating the multiple phase relationships among said navigation frequencies, and means for connecting said apparatus alternately to said receiving means and to said receiving and rectifying means, whereby said apparatus indicates the location of said mobile receiving device alternately with reference to said over-all pattern and said local pattern.

EDWARD FENNESSY.

REFERENCES CITED

The following references are of record in the file of this patent:

UNITED STATES PATENTS

| Number | Name | Date |
|---|---|---|
| 1,002,141 | Fessenden | Aug. 29, 1911 |
| 1,942,262 | Shanklin | Jan. 2, 1934 |
| 2,144,203 | Shanklin | Jan. 17, 1939 |
| 2,198,113 | Holmes | Apr. 23, 1940 |
| 2,218,907 | Donnelly et al. | Oct. 22, 1940 |
| 2,403,626 | Wolff et al. | July 9, 1946 |
| 2,408,773 | Goodall | Oct. 8, 1946 |
| 2,419,525 | Alford | Apr. 29, 1947 |

FOREIGN PATENTS

| Number | Country | Date |
|---|---|---|
| 546,000 | Germany | Feb. 18, 1932 |